(12) United States Patent
Johri et al.

(10) Patent No.: US 9,932,031 B2
(45) Date of Patent: Apr. 3, 2018

(54) SYSTEM AND METHOD FOR HYBRID VEHICLE ENGINE STARTS

(71) Applicant: Ford Global Technologies, LLC, Dearborn, MI (US)

(72) Inventors: Rajit Johri, Canton, MI (US); Francis Thomas Connolly, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 15/150,460

(22) Filed: May 10, 2016

(65) Prior Publication Data

US 2017/0327106 A1    Nov. 16, 2017

(51) Int. Cl.
| | |
|---|---|
| *B60L 9/00* | (2006.01) |
| *B60W 20/40* | (2016.01) |
| *B60W 20/13* | (2016.01) |
| *B60K 6/387* | (2007.10) |
| *B60K 6/40* | (2007.10) |
| *B60K 6/445* | (2007.10) |
| *B60K 6/46* | (2007.10) |
| *B60K 6/54* | (2007.10) |

(Continued)

(52) U.S. Cl.
CPC .............. *B60W 20/40* (2013.01); *B60K 6/387* (2013.01); *B60K 6/40* (2013.01); *B60K 6/445* (2013.01); *B60K 6/46* (2013.01); *B60K 6/54* (2013.01); *B60W 10/023* (2013.01); *B60W 10/06* (2013.01); *B60W 20/13* (2016.01); *B60W 2520/30* (2013.01); *B60W 2540/10* (2013.01); *B60W 2710/021* (2013.01); *B60W 2710/028* (2013.01); *B60W 2710/0644* (2013.01); *B60Y 2200/92* (2013.01); *B60Y 2300/425* (2013.01); *B60Y 2300/67* (2013.01); *Y10S 903/914* (2013.01); *Y10S 903/917* (2013.01); *Y10S 903/93* (2013.01); *Y10S 903/951* (2013.01)

(58) Field of Classification Search
CPC .... B60W 20/40; B60W 20/13; B60W 10/023; B60W 10/06; B60W 2520/30; B60W 2540/10; B60W 2710/021; B60K 6/387; B60K 6/40; B60K 6/445; B60K 6/54
USPC .............. 701/22; 477/110, 111, 107, 54, 108
See application file for complete search history.

(56) References Cited

U.S. PATENT DOCUMENTS

8,852,054 B2    10/2014   Shelton et al.
8,998,771 B2     4/2015   Pietron et al.
(Continued)

*Primary Examiner* — Shardul D Patel
(74) *Attorney, Agent, or Firm* — David B. Kelley; Brooks Kushman P.C.

(57) ABSTRACT

A method for operating a powertrain of a hybrid vehicle is provided. The method includes outputting via a controller an engine speed command that is based on a predicted impeller speed of a torque converter and corresponds to the accelerator tip-in to output a torque from the engine to wheels of the vehicle in response to detection of an accelerator pedal tip-in greater than a predetermined threshold. The method may also include accessing a history of impeller speed outputs of the hybrid vehicle to obtain the predicted impeller speed. The engine speed command may set engine speed substantially equal to or greater than the predicted impeller speed. The predetermined threshold may be based on a driver requested torque output of the wheels in which torque from the torque converter to the wheels results in saturation.

14 Claims, 4 Drawing Sheets

(51) Int. Cl.
    *B60W 10/02*     (2006.01)
    *B60W 10/06*     (2006.01)

(56) References Cited

U.S. PATENT DOCUMENTS

| | | | |
|---|---|---|---|
| 9,174,637 B2* | 11/2015 | Banker | B60W 10/06 |
| 2003/0006076 A1* | 1/2003 | Tamor | B60K 6/48 180/65.25 |
| 2008/0261770 A1* | 10/2008 | Tabata | B60K 6/40 477/5 |
| 2009/0188935 A1* | 7/2009 | Coughlin | G07F 11/16 221/13 |
| 2011/0160020 A1* | 6/2011 | Lee | F16H 61/143 477/168 |
| 2012/0150399 A1* | 6/2012 | Kar | F02D 11/105 701/54 |
| 2014/0162838 A1* | 6/2014 | Doering | B60W 20/40 477/5 |
| 2014/0222269 A1* | 8/2014 | Tsutsumi | B60W 20/40 701/22 |
| 2015/0151736 A1* | 6/2015 | Kim | B60W 10/06 701/22 |
| 2016/0236674 A1* | 8/2016 | Mori | B60K 6/485 |
| 2016/0288794 A1* | 10/2016 | Inoue | B60W 30/06 |
| 2016/0297418 A1* | 10/2016 | Zhang | B60W 10/06 |
| 2016/0332634 A1* | 11/2016 | Jeong | B60W 40/076 |

* cited by examiner

SYSTEM AND METHOD FOR HYBRID VEHICLE ENGINE STARTS

TECHNICAL FIELD

The present disclosure relates to control strategies for powertrains of hybrid vehicles.

BACKGROUND

Hybrid electric vehicles (HEV's) include an internal combustion engine and an electric traction motor to provide power to propel the vehicle. One method of increasing fuel economy in an HEV is to shut down the engine when the overall power demands are low. However, if the overall power demands increase such that the traction motor cannot provide enough power to meet the demand, or if the traction battery state of charge (SOC) is below a certain threshold, the engine must be activated to supplement the power output of the traction motor.

SUMMARY

A method for operating a powertrain of a hybrid vehicle includes outputting via a controller an engine speed command that is based on a predicted impeller speed of a torque converter and corresponds to the accelerator tip-in to output a torque from the engine to wheels of the vehicle. The output occurs in response to detection of an accelerator pedal tip-in greater than a predetermined threshold. The method may also include accessing a history of impeller speed outputs of the hybrid vehicle to obtain the predicted impeller speed. The engine speed command may set engine speed substantially equal to or greater than the predicted impeller speed. The predetermined threshold may be based on a driver requested torque output of the wheels in which torque from the torque converter to the wheels results in saturation. The predetermined threshold may be based on a driver requested torque output of the wheels corresponding to a 50% to 100% accelerator tip-in. The engine speed command may be based on impeller speed data included in a torque converter model accessible by the controller. The method may also include engaging a disconnect clutch when a speed of a M/G of the powertrain begins to saturate due to M/G torque limits.

A method for controlling a powertrain of a hybrid vehicle includes detecting an accelerator pedal tip-in greater than a predetermined threshold via a pedal sensor. The method also includes accessing a torque converter model responsive to the detection, by a controller in communication with the pedal sensor, to obtain a predicted impeller speed corresponding to the accelerator tip-in. The method also includes outputting an engine command speed to an engine, by the controller, equal to or greater than the predicted impeller speed to generate a torque output from the engine to a set of wheels. The method may also access a history of impeller speed outputs of the hybrid vehicle to obtain the predicted impeller speed. The predetermined threshold may be based on a 50% to 100% application of the accelerator pedal. A disconnect clutch may be directed to engage the engine responsive to the detection. A disconnect clutch may be directed to engage in response to a speed of a M/G of the powertrain beginning to saturate due to M/G torque limits. The predetermined threshold may be based on a driver requested torque output of the wheels in which torque from a torque converter to the wheels results in saturation. The predetermined threshold may be based on a detected condition in which an impeller speed of an M/G passes a motor knee point for a constant torque.

A powertrain of a hybrid vehicle includes a motor/generator (M/G), an engine, a disconnect clutch, a transmission, a final drive, a torque converter, and a controller. The M/G is operably coupled to a driveline. The disconnect clutch is between the M/G and the engine to selectively connect the engine to the driveline. The transmission controls a power output to a set of wheels. The final drive is in communication with the transmission to direct operation of the set of wheels. The torque converter includes an impeller and is located between the M/G and the transmission. The controller is programmed to monitor tip-in applications to an accelerator pedal in communication with the engine and M/G, and to increase engine speed to a predetermined speed based on a predicted speed of the impeller corresponding to the tip-in application being greater than a predetermined threshold. The predetermined speed of the engine may be equal to or greater than the predicted impeller speed. The predicted impeller speed may be based on data accessed by the controller from a torque converter model. The predetermined threshold of the tip-in application of the accelerator pedal may be based on a tip-in equal to or greater than a 50% tip-in. The predetermined threshold of the tip-in application of the accelerator pedal may be based on an amount the torque converter opens. The predetermined speed of the engine may be substantially equal to the predicted impeller speed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
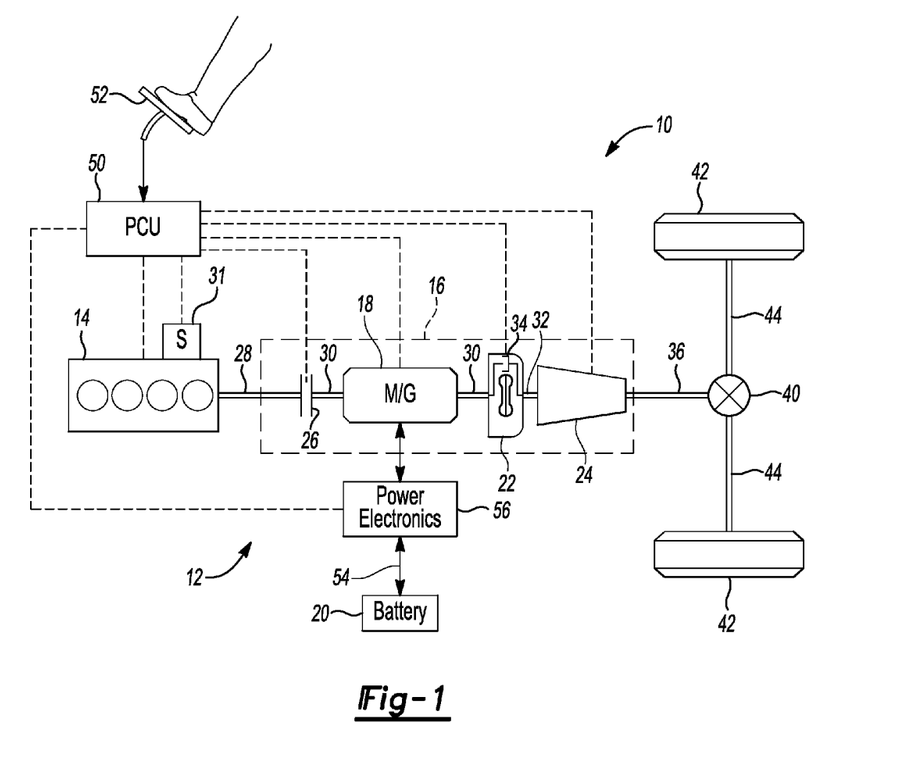
FIG. 1 is a schematic diagram illustrating an example of a hybrid vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
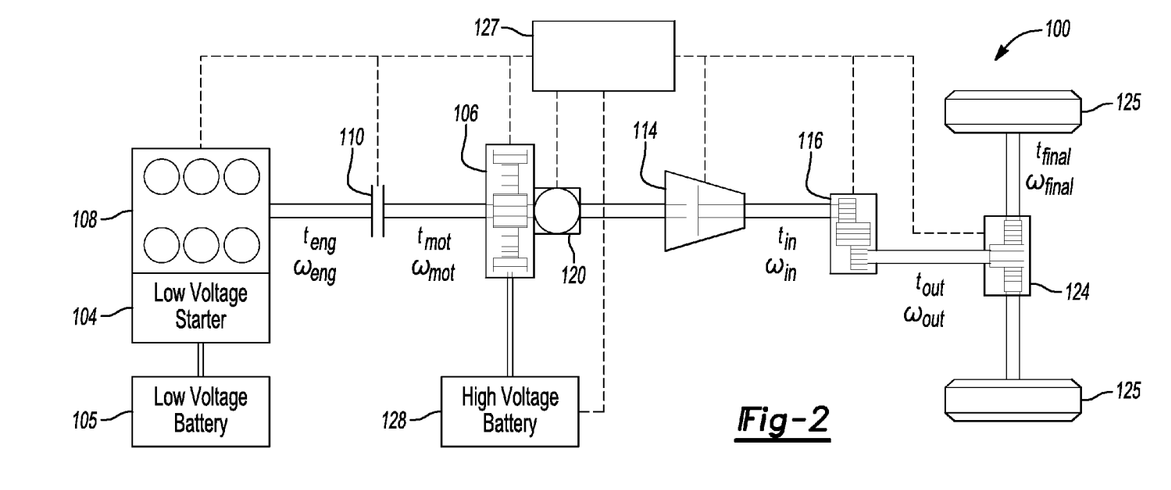
FIG. 2 is a schematic diagram illustrating an example of a powertrain for a hybrid vehicle.

FIG. 2 shows a schematic diagram of an example of a powertrain, referred to generally as a powertrain 100. The powertrain 100 relates to a WIT of a HEV. The powertrain 100 may include a low voltage starter 104 and a M/G 106. The low voltage starter 104 or the M/G 106 may assist in starting an engine 108. A low voltage batter 105 may provide power to the low voltage starter 104. A disconnect clutch 110 may separate the engine 108 and the M/G 106. A torque converter 114 with a bypass clutch (or launch clutch) is located between the M/G 106 and a transmission gearbox 116. The torque converter 114 may transmit or multiply torque generated by the engine 108 or the M/G 106. A transmission oil pump 120 may be located on a same shaft as the M/G 106 to provide oil flow through the transmission gearbox 116 to provide lubrication and support hydraulic operation. The transmission oil pump 120 may be supplemented by an electric auxiliary pump (not shown in FIG. 2). The disconnect clutch 110 may connect the engine 108 to other components of the powertrain 100 to assist in facilitating decoupling and shutdown of the engine 108 independent of operation of other vehicle components. The M/G 106 may be located between the engine 108 and the torque converter 114. The M/G 106 may be connected to the transmission gear box 116 which is connected to a final drive 124. The torque converter 114 may include a bypass clutch to lock an impeller and turbine of the torque converter 114. The final drive 124 may be connected to a set of wheels 125 to direct operation thereof.

Under vehicle operating conditions, a driver's requests are interpreted by a controller, such as a controller 127, and the controller 127 may direct operation of the powertrain 100 components. An example of the controller 127 includes an electronic control unit. Examples of driver requests may include a gear selection (PRNDL) and an accelerator pedal position (APPS) which reflect a driver's intention of wheel torque. The driver's input on a brake pedal (BPPS) is interpreted by a brake system control module (BSCM) and a wheel torque modification request is sent to the controller 127 to adjust a final wheel torque. A high voltage battery controller (BECM) monitors temperature, voltage, current, and a state of charge of a high voltage battery 128. The BECM determines a maximum allowable discharge power limit and a maximum allowable charge power limit of the high voltage battery 128. The controller 127 may determine an operating point of the powertrain 100 to maintain a predetermined battery state of charge, to minimize fuel consumption, and to deliver vehicle performance according to the driver's requests. A torque control (TC) feature of the controller 127 determines a torque split between the engine 108 and the M/G 106.

The engine 108 may be started using the engine disconnect clutch 110. Alternatively, an additional starter or belt mounted starter/alternator (BISG) may be used to start the engine 108. When the engine 108 is started during EV drive using the disconnect clutch 110, the M/G 106 may supply torque to propel the vehicle and start the engine 108 of the vehicle. Extra torque to start the engine 108 is predetermined to prevent an input torque to the transmission gear box 116 that deviates from the driver's demand in the form of a torque hole or torque surge. Accurate estimation of the torque going through the disconnect clutch 110 assists in obtaining the predetermined extra torque.

Use of an alternate starting device, such as the BISG, provides an operation to isolate starts of the engine 108 from the rest of the vehicle components of the powertrain 100. However, it may still be desirable to start the engine 108 quickly and to minimize the torque disturbance to the transmission gear box 116 during locking of the disconnect clutch 110. For large accelerator tip-in starts, it may be desirable to quickly connect the engine 108 and provide the driver demanded torque. Also, it may be desirable to provide continuous torque to the driveline from the M/G 106 until the engine 108 is connected and able to provide the requested torque.

A large accelerator pedal tip-in will result in an opening of the torque converter 114 if previously closed. With the torque converter 114 open, a large driver demanded torque from the M/G 106 will result in an increased spinning of the impeller to generate the requested wheel torque. The torque transferred through the torque converter 114 is proportional to the speed of the impeller. However, due to a low inertia of the M/G 106 and the impeller, the large request in M/G 106 torque due to driver demand will cause the impeller speed to rise quickly. A rise in the impeller speed will eventually result in a reduction of available M/G 106 torque which in turn may saturate a speed of the M/G 106 the motor speed.

Figure 3:
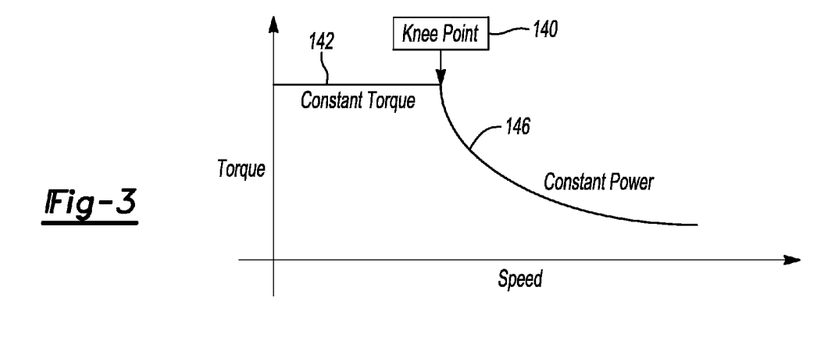
FIG. 3 is a graph showing an example of torque output versus speed output for a vehicle.

FIG. 3 shows an example of a torque versus speed graph for an electric machine of a vehicle. The impeller of the M/G 106 speed passes a motor knee point 140 for a constant torque 142. In this scenario, the torque of the M/G 106 will drop with an increase in impeller speed of the M/G 106 during operation in a constant power 146. Increasing the speed of the impeller of the M/G 106 will result in a reduction in available M/G 106 torque from the high voltage battery 128. Available M/G 106 torque from the high voltage battery 128 may be defined by battery power divided by motor speed. Increasing motor speed will result in larger electrical losses within the M/G 106 and an amount of available mechanical power will reduce for constant power limits of the high voltage battery 128:

$$\tau_{mtr} = \frac{(P_{Batt} - P_{mtr}^{loss})}{\omega_{mtr}}$$

As available torque of the M/G 106 starts decreasing, impeller speed of the M/G 106 will begin to saturate. Since the torque transferred through the torque converter 114 is proportional to the speed of the impeller, the torque to the wheels 125 will begin to saturate. As a result, no additional torque to the wheels 125 may be provided until the engine 108 has started and connected with the driveline.

Figure 4:
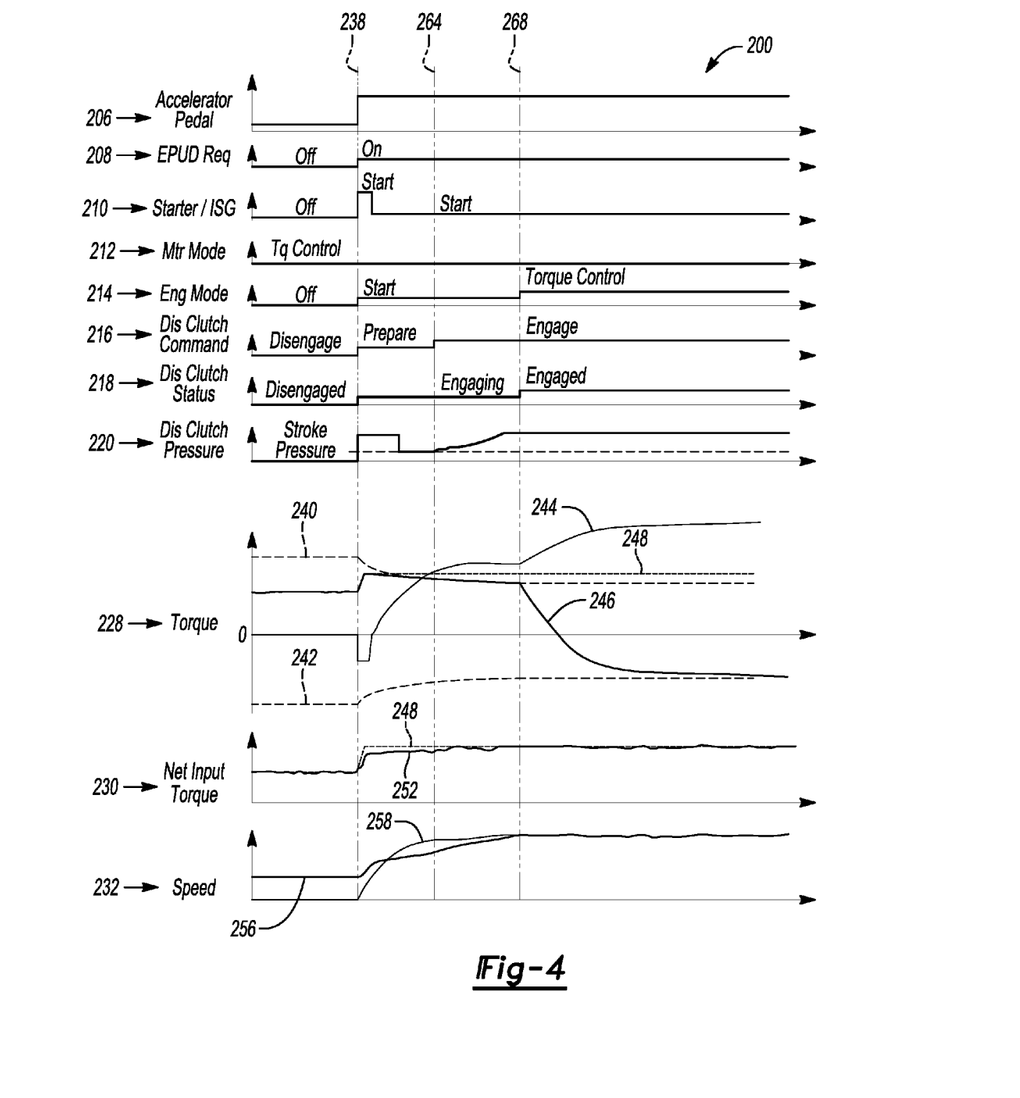
FIG. 4 is a signal diagram showing an example of an algorithm for a control strategy for a hybrid vehicle.

FIG. 4 shows an example of an algorithm for a control strategy to start an engine quickly and provide continuous torque to wheels during a large accelerator pedal tip-in event, referred to generally as an algorithm 200 herein. Vehicle component operation is represented in FIG. 4 and may be directed by a controller in communication with the vehicle components. For example, operation 206 relates to driver input to an accelerator pedal, operation 208 relates to a status of request for engine pull up/pull down (EPUD), operation 210 relates a status of a starter/ISG, operation 212 relates to a mode of a motor, operation 214 relates to an engine mode, operation 216 relates to a disconnect clutch command, operation 218 relates to a disconnect clutch status, and operation 220 relates to a disconnect clutch pressure.

M/G and engine output commands may correspond with occurrence of operations 206 through 222. For example, plots 228 relate to output torque commands of the M/G and engine. Plots 230 relate to net input torque commands of the M/G and engine. Plot 232 relates to speed commands of the M/G and engine. In plot 228 a motor max torque 240, a motor min torque 242, an engine torque 244, a M/G torque 246, and a driver demand input torque 248 are illustrated. In plots 230, the driver demand input torque 248 and a net input torque 252 are illustrated. In plots 232, an M/G speed 256 and an engine speed 258 are illustrated.

Position 238 represents a start to the engine via a starter/ISG. Alternatively, a disconnect clutch may be used to crank the engine. At position 238, a large tip-in to the accelerator pedal is shown in operation 206. This large tip-in may be considered a tip-in above a predetermined threshold. The predetermined threshold may be based on a driver requested torque output of the wheels corresponding to a 50% to 100% accelerator pedal tip-in. Another example of the predetermined threshold may be based on a speed of the M/G in which the powertrain begins to saturate due to M/G torque limits. Yet another example of the predetermined threshold may be based on a driver requested torque output of the wheels in which torque from the torque converter to the wheels results in saturation.

Continuing to refer to position 238, the EPUD request is shown as 'on' in operation 208. The M/G is shown to be in torque control mode in 212 and the engine is shown in a start mode in operation 214. The controller may send a command to the disconnect clutch to prepare for engagement as shown in operation 216. A corresponding engagement status of the disconnect clutch is shown in operation 218 and a corresponding disconnect clutch pressure is shown in operation 220.

As mentioned above, controller directed output commands are shown in plots 228, 230, and 232. At position 238, plots 228 shows the engine torque 244 as negative due to an amount of torque required to crank the engine. The driver demand input torque 248 is reflective of the large tip-in of the accelerator pedal. M/G torque 246 is shown increasing following the engine start. Plots 228 and 230 show the net input torque 252 based on the engine torque 244 and the M/G torque 246. Plots 232 show commands to the M/G and the engine increasing speed in response to the large tip-in of the accelerator pedal.

Position 264 is reflective of an interim position between the position 238 and the position 268. An example of a time interval between position 238 and position 268 is approximately ½ of a second. Position 268 is reflective of the disconnect clutch engaging the engine to operate with the M/G. As shown in plots 228, the engine torque 244 increases and the M/G torque 246 decreases following position 268. As shown in plots 232, the command to increase engine speed 258 sets the speed of the engine at a higher or substantially equal speed to that of the M/G. The engine speed 258 may be based on an impeller speed of a torque converter reflective of an impeller speed necessary to achieve a desired torque output. For example, the controller may access a torque converter model to obtain an impeller speed reflective of the driver demand input torque 248. The controller may then direct the engine to operate at a speed equal to or greater than the impeller speed. By doing so, additional torque from the engine is used to satisfy the driver demanded input torque 248 of the large accelerator tip-in from a torque output viewpoint. For example, the disconnect clutch may be used to pull the motor and vehicle speed toward the engine speed to effectively add torque to the driveline past motor saturation.

Figure 5:
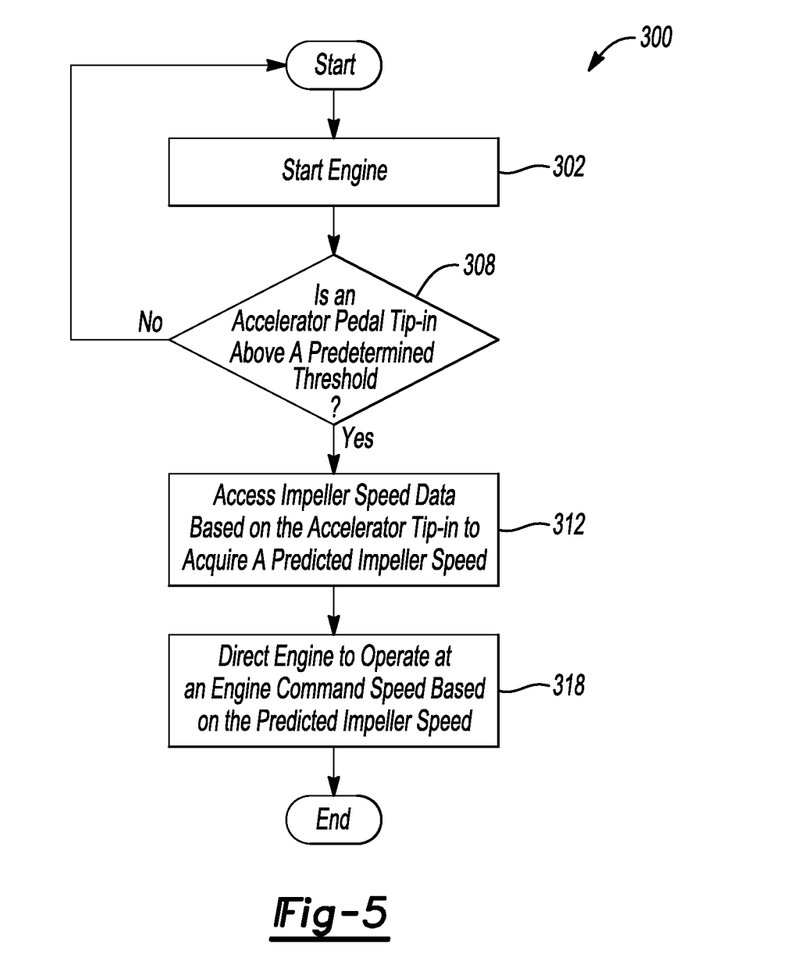
FIG. 5 is a flow chart showing an example of another algorithm for a control strategy for a hybrid vehicle.

FIG. 5 shows an example of an algorithm for a control strategy to start an engine and provide continuous torque to wheels during a large accelerator pedal tip-in event, referred to generally as an algorithm 300 herein. In operation 302, a controller may direct an engine to start based on driver input. For example, a starter/BISG may issue a start command or the engine may be started using the disconnect clutch. In operation 308, a sensor may measure an accelerator pedal tip-in and transmit the measurement to the controller. The accelerator tip-in may correspond to an amount of wheel torque requested by a driver. In the event the accelerator tip-in is below a predetermined threshold, the algorithm 300 may return to the start and continue monitoring accelerator tip-in. In the event the accelerator pedal tip-in is above the predetermined threshold, a controller may access impeller speed data of a torque converter model based on the accelerator tip-in to acquire a predicted impeller speed of the torque converter in operation 312.

The impeller speed data may be accessed from a history of impeller speed outputs corresponding to previous accelerator tip-in applications of the vehicle. Drive demanded torque may be input into the torque converter model to obtain a corresponding impeller speed to identify the predicted impeller speed. An example of the predetermined threshold includes a driver requested torque output of the wheels in which torque form the torque converter to the wheels results in saturation. Another example of the predetermined threshold includes an accelerator pedal tip in of 50% to 100%. In operation 318, the controller may direct the engine to operate at an engine command speed based on the predicted impeller speed. For example, the engine command speed may be equal to or greater than the predicted impeller speed. Operating the engine at the engine command speed may prevent saturation of torque distributed to the wheels.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A powertrain operation method for a hybrid vehicle comprising:
    responsive to detection of an accelerator pedal tip-in corresponding to a wheel torque output from a torque converter resulting in saturation, outputting via a controller an engine speed command that is based on a torque converter impeller speed obtained from a torque converter model and reflective of the accelerator tip-in, to output a torque from an engine to wheels of the vehicle.

2. The method of claim 1, wherein the obtained torque converter impeller speed is based on a history of impeller speed outputs of the hybrid vehicle.

3. The method of claim 1 wherein the engine speed command sets engine speed substantially equal to or greater than the obtained torque converter impeller speed.

4. The method of claim 1, wherein the accelerator pedal tip-in corresponds to a driver requested torque output of the wheels corresponding to a 50% to 100% accelerator tip-in.

5. The method of claim 1 further comprising engaging a disconnect clutch when a speed of a motor/generator (M/G) of the powertrain begins to saturate due to M/G torque limits.

6. A method for controlling a powertrain of a hybrid vehicle comprising:
    detecting an accelerator pedal tip-in between 50% and 100% of accelerator pedal tip-in via a pedal sensor;
    responsive to the detection, accessing a torque converter model, by a controller in communication with the pedal sensor, to obtain a predicted impeller speed based on a history of previous accelerator pedal tip-in applications and corresponding to the accelerator tip-in; and
    outputting an engine command speed to an engine, by the controller, equal to or greater than the predicted impeller speed to generate a torque output from the engine to a set of wheels.

7. The method of claim 6 further comprising accessing a history of impeller speed outputs of the hybrid vehicle to obtain the predicted impeller speed.

8. The method of claim 6 further comprising directing a disconnect clutch to engage the engine responsive to the detection.

9. The method of claim 6 further comprising engaging a disconnect clutch in response to a speed of a motor/generator (M/G) of the powertrain beginning to saturate due to M/G torque limits.

10. The method of claim 6, wherein the accelerator pedal tip-in is a tip-in in which a driver requested torque output from a torque converter to the wheels results in saturation.

11. The method of claim 6, wherein the accelerator pedal tip-in is such that an impeller speed of a motor/generator passes a motor knee point for a constant torque.

12. A powertrain of a hybrid vehicle comprising:
    a motor/generator (M/G) operably coupled to a driveline;
    an engine;
    a disconnect clutch between the M/G and the engine to selectively connect the engine to the driveline;
    a transmission to control a power output to a set of wheels;
    a final drive in communication with the transmission to direct operation of the set of wheels;
    a torque converter including an impeller and located between the M/G and the transmission; and
    a controller programmed to monitor tip-in applications to an accelerator pedal in communication with the engine and M/G, and to increase engine speed to a predetermined speed based on a torque converter impeller speed obtained from a torque converter model and reflective of the accelerator tip-in and corresponding to the accelerator tip-in equating to a wheel torque output from the torque converter resulting in saturation.

13. The powertrain of claim 12, wherein the predetermined speed of the engine is equal to or greater than the obtained torque converter impeller speed.

14. The powertrain of claim 12, wherein the tip in application of the accelerator pedal is a tip-in equal to or greater than a 50% tip-in.

* * * * *